(12) United States Patent
Droppo et al.

(10) Patent No.: US 7,418,383 B2
(45) Date of Patent: Aug. 26, 2008

(54) NOISE ROBUST SPEECH RECOGNITION WITH A SWITCHING LINEAR DYNAMIC MODEL

(75) Inventors: James Droppo, Duvall, WA (US); Alejandro Acero, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 816 days.

(21) Appl. No.: 10/933,763

(22) Filed: Sep. 3, 2004

(65) Prior Publication Data

US 2006/0053008 A1      Mar. 9, 2006

(51) Int. Cl.
*G10L 15/00*       (2006.01)
*G10L 15/06*       (2006.01)

(52) U.S. Cl. ...................... 704/236; 704/243
(58) Field of Classification Search .................. 704/236
See application file for complete search history.

(56) References Cited

U.S. PATENT DOCUMENTS

| 6,591,146 | B1 * | 7/2003 | Pavlovic et al. ............... 700/29 |
| 2003/0033143 | A1 * | 2/2003 | Aronowitz ................... 704/233 |

OTHER PUBLICATIONS

Joe Frankel, 'Linear dynamic models for automatic speech recognition,' Thesis, Univ. of Edinburgh; Apr. 2003, pp. 87-88, 105-111, 234-238 and 250.*

Zoubin Ghahramani and Geoffrey E. Hinton, Variational Learning for Switching State-Space Models, Neural Computation, vol. 12, pp. 831-864, 2000.*

Frey et al., B.; "Algonquin: Iterating Laplace's Method to Remove Multiple Types of Acoustic Distortion for Robust Speech Recognition," Proc. 2001 Eurospeech, Aalbork, Denmark, Sep. 2001. 4 pgs.

Droppo & Acero, J. & A.; "Noise Robust Speech Recognition with a Switching Linear Dynamic Model," Abstract and paper, Aug. 2004.

Singh and Raj, R. & B.; "Tracking Noise Via Dynamic Systems with a Continuum of States," Proc. ICASSP, 2003, v. I, pp. 396-399.

Moreno, P.; Speech Recognition in Noisy Environments, Ph.D. thesis, Carnegie Mellon University, 1996. Carnegie Mellon University, 1996.

Stouten et al., V.; "Robust Speech Recognition Using Model-Based Feature Enhancement," Eurospeech 2003—Interspeech 2003, 8th European Conf. On Speech Communication and Technology, Geneva, Switzerland, Sep. 2003, 2 pgs.

(Continued)

*Primary Examiner*—David R. Hudspeth
*Assistant Examiner*—Justin W Rider
(74) *Attorney, Agent, or Firm*—Westman, Champlin & Kelly, P.A.

(57) ABSTRACT

A unified, nonlinear, non-stationary, stochastic model is disclosed for estimating and removing effects of background noise on speech cepstra. Generally stated, the model is a union of dynamic system equations for speech and noise, and a model describing how speech and noise are mixed. Embodiments also pertain to related methods for enhancement.

20 Claims, 9 Drawing Sheets

OTHER PUBLICATIONS

Hirsch & Pearce, H. & D.; "The Aurora Experimental Framework for the Performance Evaluation of Speech Recognition Systems Under Noisy Conditions," ISCA ITRW ASR2000 "Automatic Speech Recognition: Challenges for the Next Millenium," Paris, France, Sep. 2000, 8 pgs.

Bar-Shalom, Y.; "Estimation and Tracking: Principles, Techniques and Software"—Book Review online...amazon.com, Artech House, Norwood, MA 1993. 3 pgs.

Droppo et al., J.; "A Comparison of Three Non-Linear Observation Models for Noisy Speech Features," Microsoft research, Redmond, WA, Proc. 2003 Eurospeech, Geneva, Switzerland, Sep. 2003. 4 pgs.

Droppo et al., J.; "Uncertainty Decoding with SPLICE for Noise Robust Speech Recognition," Orlando, Florida, Sep. 2000, 1 pg abstract only.

* cited by examiner

NOISE ROBUST SPEECH RECOGNITION WITH A SWITCHING LINEAR DYNAMIC MODEL

BACKGROUND OF THE INVENTION

The present invention generally pertains to pattern recognition systems. More particularly, the present invention pertains to methods for reducing the adverse impact of noise on signals utilized within speech recognition systems.

A pattern recognition system, such as a speech recognition system, takes an input signal and attempts to decode the signal and identify an incorporated pattern. For example, in a speech recognition system, a speech signal (often referred to as a test signal) is received by the recognition system and is decoded to identify a string of words represented by the speech signal.

To decode the incoming text signal, most recognition systems utilize one or more models that describe the likelihood that a portion of the test signal represents a particular pattern. Examples of such models include Neural Nets, Dynamic Time Warping, segment models, and Hidden Markov Models.

Before a model is used to decode an incoming signal, it is trained. Training is typically accomplished by measuring input training signals generated from a known training pattern. For example, in speech recognition, it is common for speakers reading from a known text generate a collection of speech signals. These speech signals are then used to train the models.

In order for the models to work optimally, the signals used to train the model should be similar to the eventual test signals that are decoded. In particular, the training signals should have the same amount and type of noise as the test signals that are decoded.

Typically, the training signal is collected under "clean" conditions and is considered to be relatively noise free. To achieve this same low level of noise in the test signal, many prior art systems apply noise reduction techniques to the testing data. Automatic speech recognition systems without explicit provisions for noise robustness have proven to degrade quickly in the presence of additive noise.

Thus, how to best add noise robustness to speech recognition systems is an area of active research. There are many examples of model based feature enhancement systems. Many such systems include a model for speech, and often a model for noise as well, within an enhancement algorithm. Most techniques incorporate either Gaussian mixture models or hidden Markov models.

When the clean speech model is a Gaussian mixture model (GMM), each frame of data is enhanced independently. Without post-processing, this can result in artifacts, such as sharp single frame transitions, that were not part of the original clean speech signal.

Choosing a hidden Markov model (HMM) for the clean speech model introduces some time dependencies in the enhancement process. Although, for any given state sequence, the enhancement process is the same as for a GMM, the state transition probabilities of the HMM tend to eliminate single frame errors in the output. State transitions, however, can still produce edge artifacts, so post-processing is still generally necessary.

SUMMARY OF THE INVENTION

Embodiments of the present invention pertain to a unified, nonlinear, non-stationary, stochastic model for estimating and removing effects of background noise on speech cepstra. Generally stated, the model is a union of dynamic system equations for speech and noise, and a model describing how speech and noise are mixed. Embodiments also pertain to related methods for enhancement.

DETAILED DESCRIPTION OF ILLUSTRATIVE EMBODIMENTS

I. First Exemplary Environment

Figure 1:
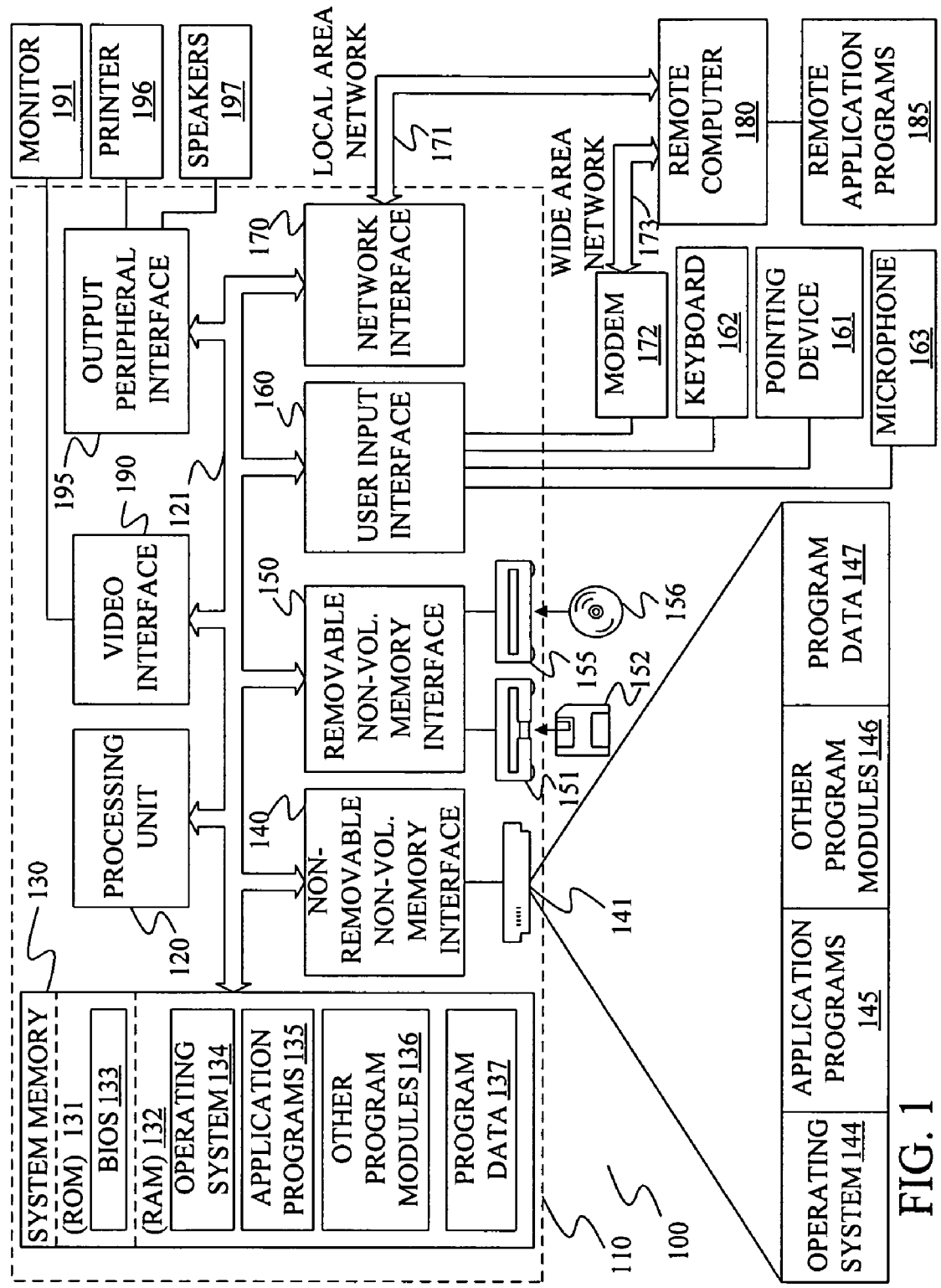
FIG. 1 is a block diagram of a computing environment in which embodiments of the present invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

II. Second Exemplary Environment

Figure 2:
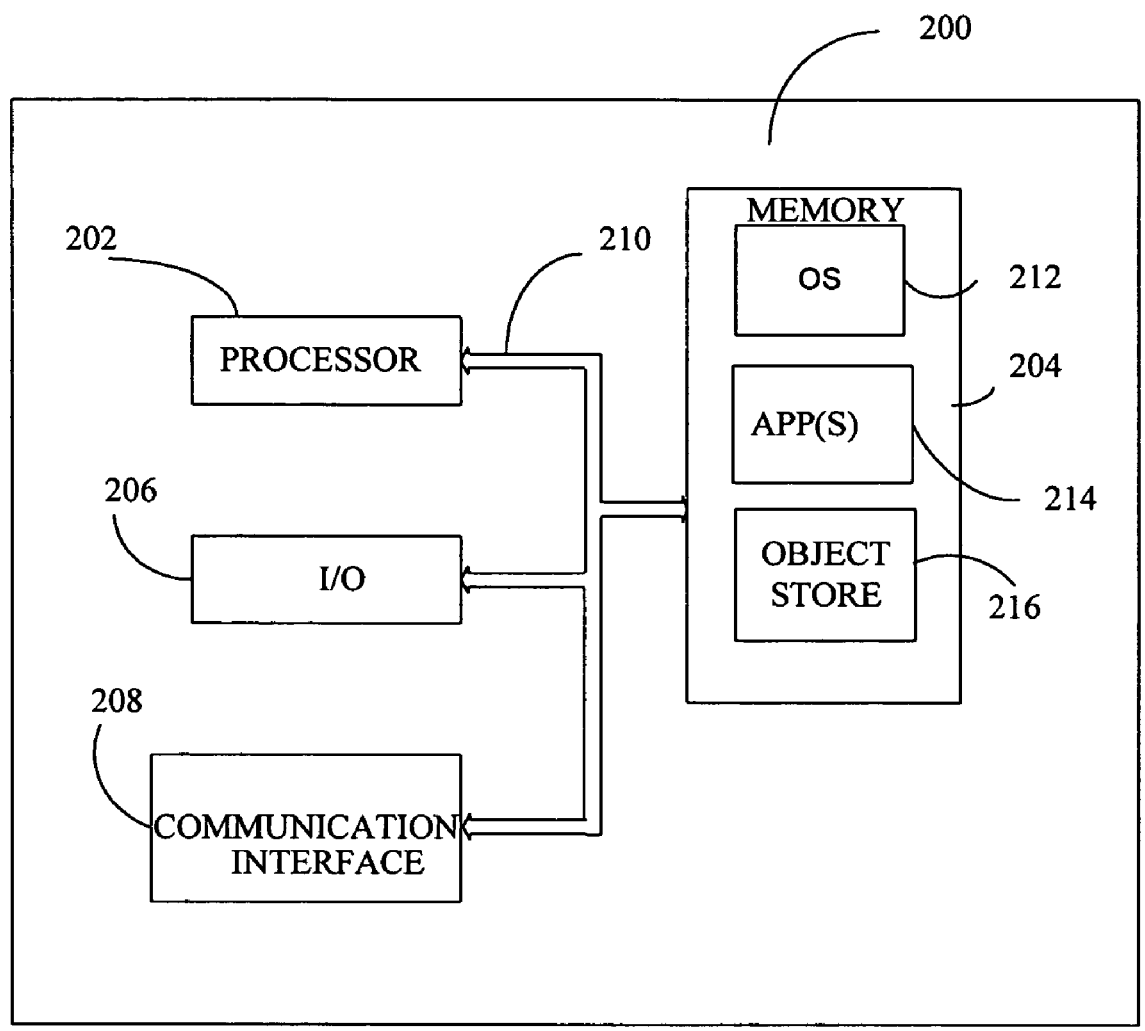
FIG. 2 is a block diagram of another computing environment in which embodiments of the present invention may be implemented.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

III. Introduction—Techniques for Speech Feature Enhancement

Embodiments of the present invention pertain to processing techniques for speech feature enhancement, the techniques being designed to improve the performance of a speech recognizer that runs on acoustic features. Broadly stated, an important motivation underlying the processing techniques described herein, and indeed speech feature enhancement generally, is to make acoustic features seem as if they were produced by a high quality microphone in a noise-free environment.

One known way to address speech feature enhancement is to equip a processing system with a model that provides an expectation of what clean speech is supposed to look like. This model information is then utilized as a basis for processing acoustic features so that they more closely approximate clean speech. The effectiveness of this approach is dependent upon the strength and accuracy of the model information utilized to represent clean speech.

In accordance with one aspect of the present invention, a switching linear dynamic model (LDM) is implemented for clean speech. The linear dynamics of this model capture the smooth time evolution of speech. The switching states of the model capture the piecewise stationary characteristics of speech. Similar to the GMM or HMM that are traditionally implemented, the switching LDM maintains the concept that, as time progresses, the signal passes through several distinct states. In addition, the switching LDM enforces a continuous state transition in the feature space, conditioned on the state sequence.

One challenge associated with incorporation of a switching LDM is that the model causes the enhancement problem to become intractable. With a GMM or an HMM, the enhancement running time is proportional to the length of the utterance, wherein enhancement of a signal with length T takes O(T) time. The switching LDM causes the running time to become exponential in the length of the utterance, wherein the enhancement algorithm takes $O(e^T)$. Even for short utterances, T is on the order of several hundred frames, and the direct approach is infeasible. In accordance with one aspect of the present invention, a standard generalized pseudo-Bayesian technique is implemented to provide an approximate solution to overcome the described enhancement drawback.

Accordingly, as will be described in greater detail below, one aspect of the present invention pertains to model based feature enhancement techniques incorporating acoustic models for speech and noise, together with a model of how the speech and noise produce the noisy observations. The model format implemented to represent clean speech and/or noise is a linear dynamic model or a switching linear dynamic model.

IV. Models for Describing Speech Characteristics

An early step in building a noise removal system is to define a set of system equations to describe clean speech and/or noise.

A standard linear dynamic model obeys the following system equation:

$$x_t = Ax_{t-1} + b + v_t \qquad \text{Eq. 1}$$

where $x_t$ represents a clean speech feature vector for time frame t, $x_{t-1}$, represents a clean speech feature vector for time t−1, the A and b variables describe how the process evolves over time, and $v_t$ is a zero-mean Gaussian noise source which drives the system. Accordingly, in order to derive a good estimate of the clean speech vector at time t, a value for a clean speech feature vector at time t−1 is rotated by a matrix operator A and added to a constant b, with a further addition of $v_t$ accounting for an uncertainty of how the process can change over time. A linear dynamic model is generally time-invariant, and is useful in describing signals such as colored stationary Gaussian noise.

Figure 3:
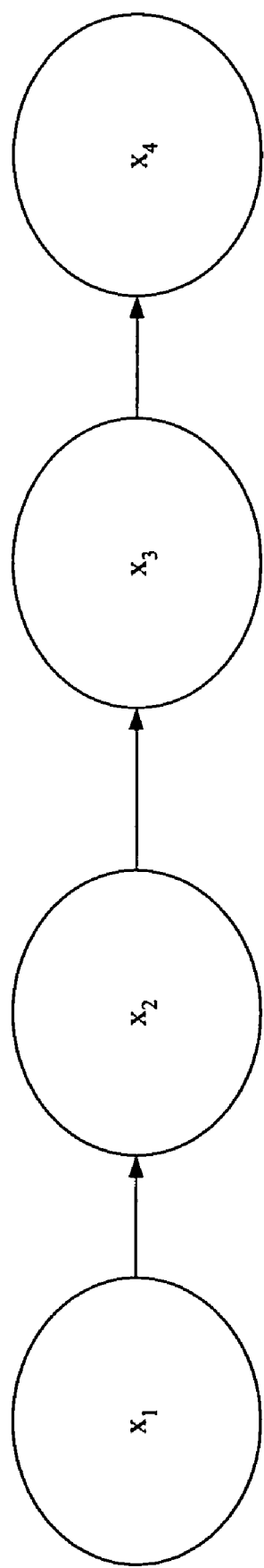
FIG. 3 is a graphical representation of a linear dynamic model.

In accordance with one embodiment, a linear dynamic model is implemented for noise. FIG. 3 is a graphical representation of such a model for noise. Equations for representing noise with a linear dynamic model in terms of probability include:

$$p(x_t | x_{t-1}) = N(x_t; Ax_{t-1} + b, C) \qquad \text{Eqs. 2 and 3}$$

$$p(x_1^T) = p(x_1) \prod_{t=2}^{T} p(x_t | x_{t-1})$$

The linear dynamic model stands in contrast to a regular stationary model where:

$$x_1 = b + u_t \quad \text{Eq. 4}$$

The linear dynamic and stationary models are both making predictions about what $x_t$ might be. However, the variance of the $v_t$ error term in Eq. 1 will generally be smaller than the error term $u_t$ in Eq. 4. This is because knowledge pertaining to a previous state is being leveraged in Eq. 1 but not in Eq. 4. The Eq. 1 linear dynamic model is especially advantageous for processes that smoothly evolve over time because it provides more predictive power.

The linear dynamic model ("LDM") is particularly well suited for describing things that have constant statistics over time. For example, such a model is good for describing a stationary vowel. The fact of the matter is, however, it is most common for the types of sounds that a person makes over time to change. The Eq. 1 linear dynamic model is not the best fit when the dynamics of changes over time are not constant.

In accordance with one aspect of the present invention, a switching linear dynamic model is implemented for speech. A notable difference associated with a switching linear dynamic model is that instead of relying on one set of predictors (i.e., A and b in FIG. 1), multiple sets of predictors are implemented. Accordingly, the switching linear dynamic model is effective even in the case where different sounds can have different temporal dynamics.

In a switching linear dynamic model ("switching LDM"), the A and b noted in Eq. 1 become dependent on a hidden variable at each time t. Thus, $$x_t = A_{s_t} x_{t-1} + b_{s_t} + v_t \quad \text{Eq. 5}$$

For the switching LDM, every unique state sequence $S_1^T$ describes a non-stationary LDM. As a result, the model is appropriate for describing a number of time-varying systems, including the evolution of speech and noise features over time.

Figure 4:
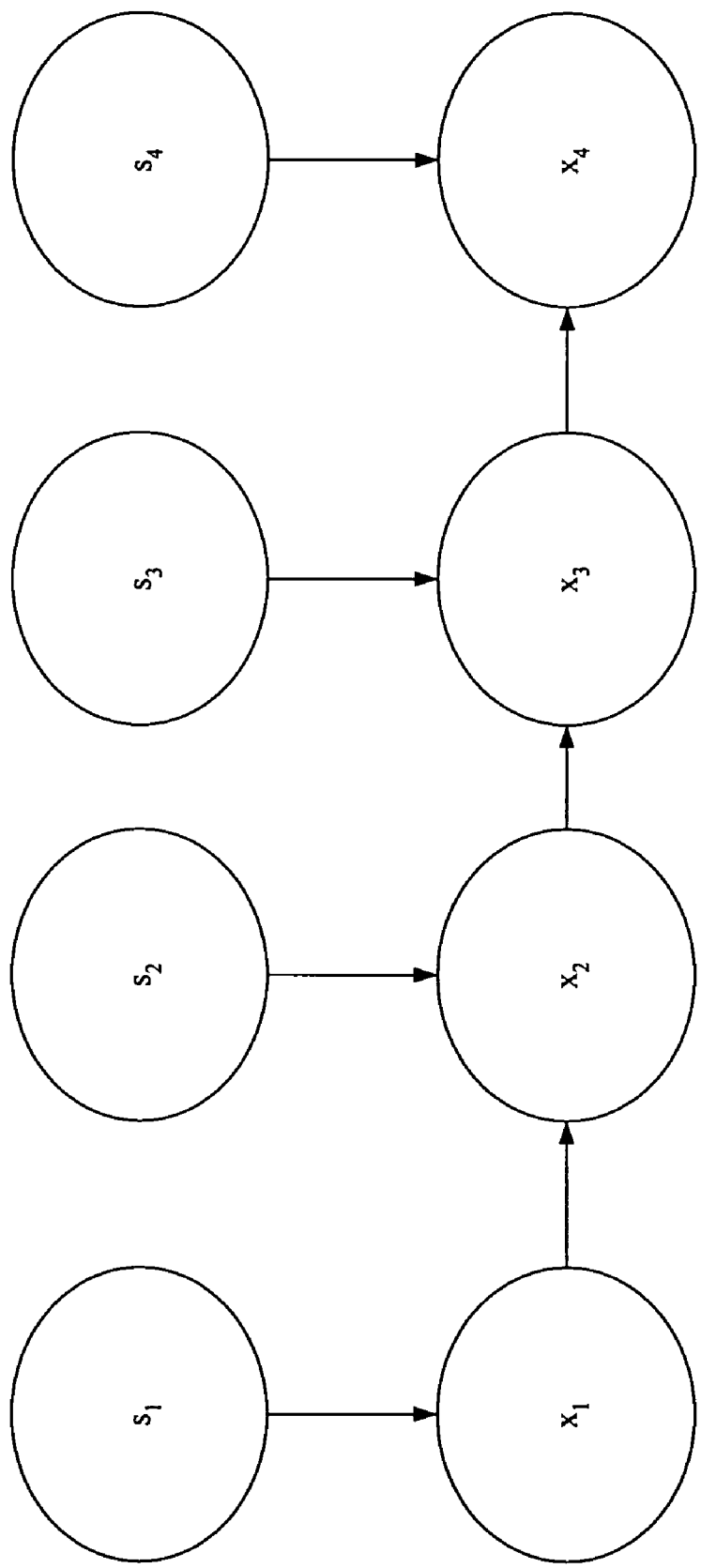
FIG. 4 is a graphical representation of a switching linear dynamic model.

FIG. 4 is a graphical representation of a switching LDM for speech. In accordance with one embodiment, the switching LDM implemented within a speech recognition system assumes time dependence among the continuous $x_t$ but not among the discrete $s_t$ state variables. This can be represented as either the graphical model of FIG. 4, or as the probability-oriented equations:

$$p(x_t, s_t | x_{t-1}) = N(x_t; A_{s_t} x_{t-1} + b_{s_t}, C_{s_t}) p(s_t) \quad \text{Eqs. 6 and 7}$$

$$p(x_1^T, s_1^T) = p(x_1, s_1) \prod_{t=2}^{T} p(x_t, s_t | x_{t-1})$$

The described model illustratively requires a prior distribution for the state sequences. Assuming independence over time is one option. Assuming a first order Markov chain (i.e., with conditional probabilities) is another option. Both of these and other obvious alternatives are within the scope of the present invention. If time-dependence among the discrete state variables were included, it would be basically analogous to modifying a GMM to become an HMM. Again, this improvement is illustratively within the scope of the present invention.

In accordance with one aspect of the present invention, utilizing data to train the parameters $\{A_s\}$, $\{b_s\}$ and $\{C_s\}$ is accomplished using standard expectation-maximization (EM) techniques. In one embodiment, the parameters are first held fixed to compute an expected state occupancy, for example, $$\gamma_t^m = p(s_t = m | x_1^T) \quad \text{Eq. 8}$$

Next, a new set of parameters is found that maximizes the expected log-likelihood of the data given the model. The result of this maximization step is illustratively:

$$A_m = (\langle x_t x'_{t-1} \rangle_m - \langle x_t \rangle_m \langle x'_{t-1} \rangle_m) \cdot (\langle x_{t-1} x'_{t-1} \rangle_m - \langle x_{t-1} \rangle_m \langle x'_{t-1} \rangle_m)^{-1}$$

$$b_m = \langle x_t \rangle_m - A_m \langle x_{t-1} \rangle_m$$

$$C_m = \langle (x_t - A_m x_{t-1} - b_m)(x_t - A_m x_{t-1} - b_m)' \rangle_m \quad \text{Eqs. 9, 10 and 11}$$

In equations 9, 10 and 11, a shorthand notation $\langle \cdot \rangle_m$ is utilized to indicate expectation over the training data. For example, $$\langle x_t x'_{t-1} \rangle_m = \frac{\sum_{i=1}^{T} \gamma_i^m x_t x'_{t-1}}{\sum_{i=1}^{T} \gamma_i^m} \quad \text{Eq. 12}$$

In the limit of one hidden state, the switching LDM becomes identical to the LDM, and these same equations can be used to train the A, b, and C in a single pass.

V. Observation Model

A. General Discussion

The observation model relates the noisy observation to the hidden speech and noise features. In accordance with one aspect of the present invention, any of a variety of observation model techniques can be implemented without departing from the scope of the present invention.

Figure 5:
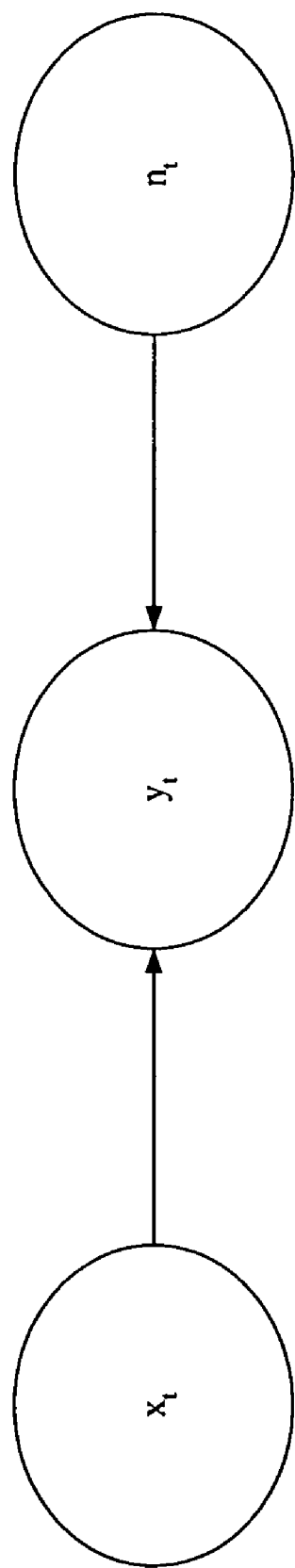
FIG. 5 is a graphical representation of an observation model.

In accordance with one embodiment, the implemented observation model is a zero variance model with signal-to-noise ratio (SNR) inference. An example of such a model is provided in J. Droppo, L. Deng, and A. Acero, *A Comparison of three non-linear observation models for noisy speech features*, in Proc. 2003 Eurospeech, Geneva, Switzerland, September 2003, pp. 681-684. FIG. 5 is a first graphical representation of this observation model, wherein the observation is a non-linear function of speech and noise. The observation model assumes that x (clean speech) and n (noise) mix linearly in the time domain, which corresponds with a non-linear mixing in the cepstral feature space.

An SNR variable r=x−n is introduced to simplify calculation. If the prior distribution for speech and noise are:

$$x \sim N(x; \mu_x, \Sigma_x), \text{ and } n \sim N(n; \mu_n, \Sigma_n) \quad \text{Eq. 13}$$

then the joint probability distribution function (PDF) of the noisy observation y and the hidden variable r can be shown to be:

$$p(y, r) = N(y - C \ln(e^{Dr} + 1) + r; \mu_x, \Sigma_x) N(y - C \ln(e^{Dr} + 1); \mu_n, \Sigma_n) \quad \text{Eq. 14}$$

Here, C represents the matrix that rotates log mel-frequency filterbank outputs into cepstra, and D represents its right inverse, such that CD=I. The behavior of the joint PDF is intuitive. At high SNR, r>>0, and:

$$p(y, r) \approx N(y; \mu_x, \Sigma_x) N(y - r; \mu_n, \Sigma_n) \quad \text{Eq. 15}$$

That is, the observation is assumed to be clean speech, and the noise is at a level r units below the observation. The converse is true for low SNR, where r<<0.

Figure 6:
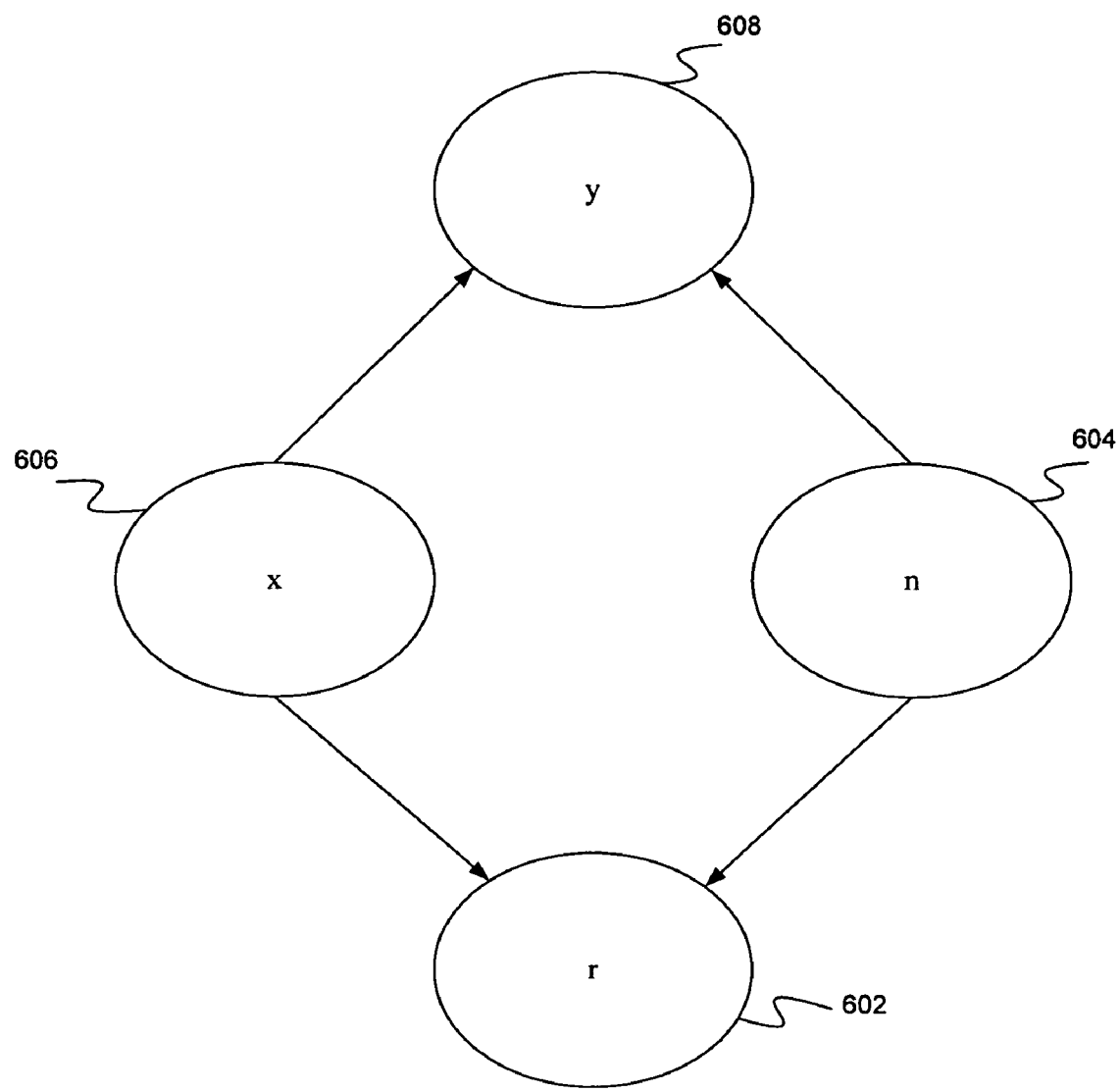
FIG. 6 is a graphical representation of an observation model.

FIG. 6 is a schematic diagram similar to FIG. 5 but includes a representation of the local signal-to-noise ratio. Circle 606 containing the variable x represents a speech hidden vector that is assumed to be clean and unobserved. Circle 602 containing the variable r represents a local signal-to-noise ratio. Circle 604 containing the variable n represents a noise vector that is assumed to be unobserved noise. Together, variables x and n generate a noisy observation represented by circle 608 containing the variable y.

As has been described, an observation y supports a belief about the local signal-to-noise ratio r, which then can be utilized as a basis for generating a distribution over the clean speech x. A model for speech p(x, s) and a model for noise p(n) are applied in the context of an observation y=f(x, n) to derive p(y, r, s) similar to Eqs. 14 and 15, which relate an observation y to the hidden signal-to-noise ratio variable r.

A challenge arises in that Eq. 14 is quite non-linear in variable r. In order to make r linear, a Taylor series representation is implemented:

$$f = C\ln(e^{Dr}+1) \cong C\ln(e^{Dr_0}+1) + \left(\frac{d}{dr_0}f(r_0)\right)(r-r_0) \quad \text{Eq. 16}$$

Equation 16 provides the $0^{th}$ order Taylor series coefficient, the $1^{st}$ order coefficient, and then it is cut off. This equation is linear in r and can be plugged in to create a simplified distribution:

$$p(r_t|y_t, s) = N(r_t, \hat{r}_{t,s}, \hat{\sigma}_{r,s}^2) \quad \text{Eq. 17}$$

It should be noted that while the present embodiment has been described in the context of a single expansion point, iteration is within the scope of the present invention. The Gaussian can be taken iteratively without departing from the scope of the present invention. It is within the capacity of those skilled in the art to implement Taylor series approximations that incorporate an iterative calculation technique.

B. The Zero Variance Model

The observation model, in one aspect of the present invention, defines the current noisy observation y as a nonlinear function of the clean speech x and noise n. This relationship is a direct consequence of the linear mixing of speech and noise sound waveforms, and the feature computation method.

$$y = \ln(e^x + e^n) \quad \text{Eq. 18}$$

Because Equation 18 is assumed to hold exactly, with no error, it can be referred to as a Zero Variance Model. In practice, when the instantaneous signal to noise ratio (SNR) is near 0 dB, the relative phase of the x and n signals can cause this equation to be violated.

As has been inferred, it is also useful to define the instantaneous SNR as the difference between x and n. Introducing the SNR variable enables a cleaner derivation, and reduces the complexity of the final algorithm.

$$r = x - n \quad \text{Eq. 19}$$

Together, Equations 18 and 19 have a unique solution for x and n, namely:

$$x = y - \ln(e^r + 1) + r$$

$$n = y - \ln(e^r + 1)) \quad \text{Eqs. 20 and 21}$$

These solutions can then be incorporated into the probability model as a pair of Dirac delta functions.

$$p(y, r|x, n) = \delta(y - \ln(e^r + 1) + r - x)\delta(y - \ln(e^r + 1) - n) \quad \text{Eq. 22}$$

The observation model p(y, r|x, n) is now suitable for combination with a prior model p(x, n).

VI. Posterior Estimation with Generalized Pseudo-Bayes and the Zero Variance Model A challenge associated with computing a posterior under the proposed system is that the switching LDM makes it computationally intractable. The switching LDM can take any of M hidden states at each time frame. As a result, for T frames of speech, there are $M^T$ possible state sequences, which can be a large number.

If the state sequences were known, the model would reduce to a time-varying LDM with known parameters, which is trivially solvable. The true posterior would contain only one mixture component. When the state sequence is unknown, the exact answer is a mixture of $M^T$ components; one for each possible state sequence.

In accordance with one aspect of the present invention, a generalized pseudo-Bayesian (GPB) algorithm is employed as an approximation means for reducing the size of the search space. The GPB assumes that it is not important to keep track of distinct state histories whose difference occur more than τ frames in the past.

For τ=1, the posterior is collapsed into M Gaussian components at each time step. Each of these components corresponds to a different value for the current state. For τ=2, there are $M^2$ unique histories, and a corresponding number of reduced Gaussian components. In general, the GPB algorithm reduces the inference complexity from $M^T$ to $M^\tau$, where τ<<T is chosen.

Figure 7:
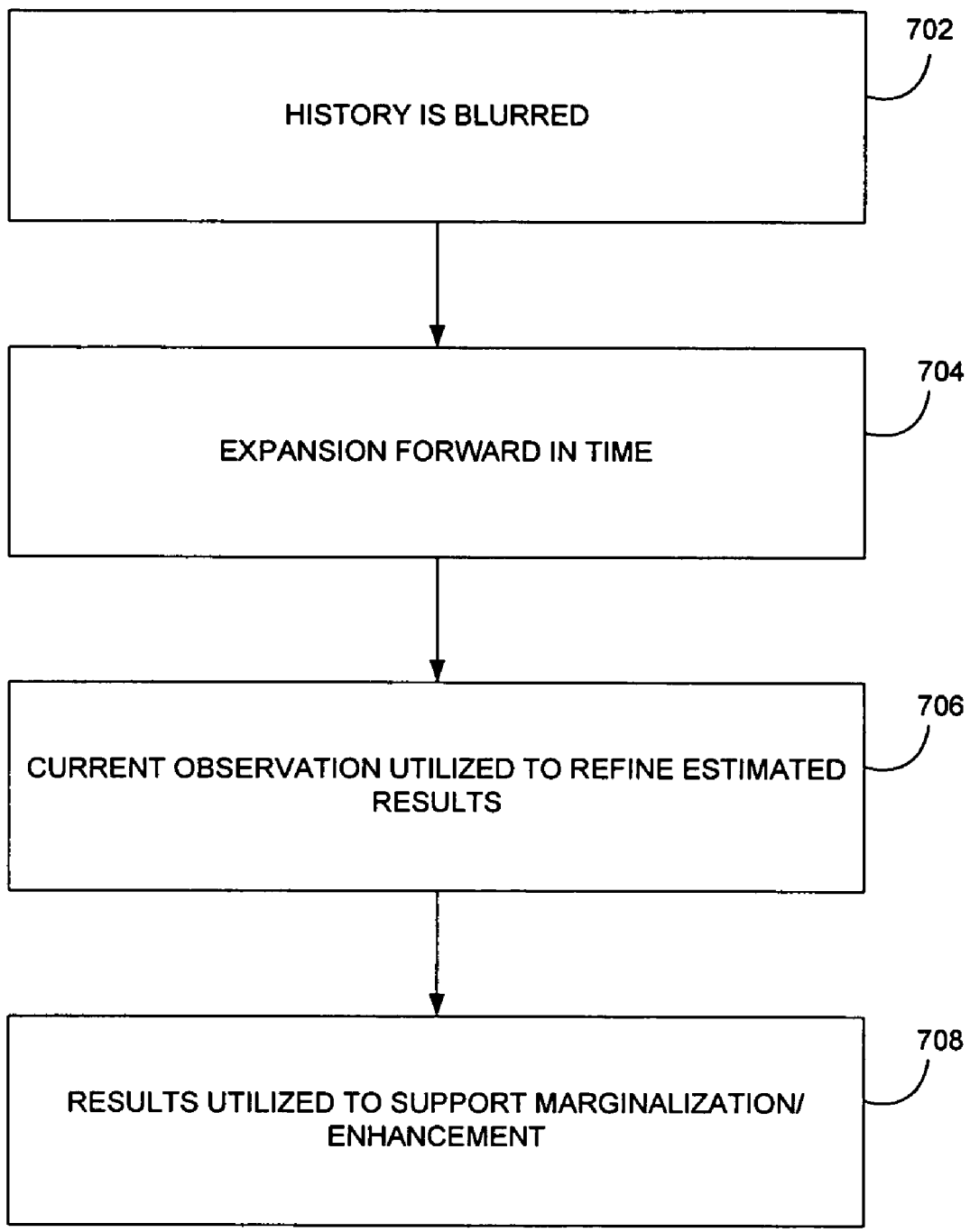
FIG. 7 is a block flow diagram demonstrating steps associated with posterior estimation and enhancement.

FIG. 7, in accordance with one aspect of the present invention, is a block flow diagram illustrating steps associated with posterior estimation. In accordance with block 702, the history is essentially blurred. In accordance with block 704, there is an expansion forward in time. Then, in accordance with block 706, the current observation is utilized to refine estimated results. Finally, in accordance with block 708, the results are utilized as a basis for supporting marginalization/enhancement techniques.

A. State History Collapsed

Before processing frame t, there are an available $M^\tau$ Gaussian components corresponding to an equal number of unique state histories. Each component incorporates observations up to $y_{t-1}$ to produce a posterior at time t−1.

$$q(x_{t-1}, n_{t-1}, y_1^{t-1}, s_{t-\tau}^{t-1}) \quad \text{Eq. 23}$$

The posterior is marginalized over states occurring τ frames in the past. Each sum of Gaussians is approximated by a single Gaussian component using moment matching. This collapses together all Gaussians that share a history of length τ−1.

$$q(x_{t-1}, n_{t-1}, y_1^{t-1}|s_{t-\tau+1}^{t-1}) \approx \sum_{s_{t-\tau}} q(x_{t-1}, n_{t-1}, y_1^{t-1}|s_{t-\tau}^{t-1})p(s_{t-\tau}) \quad \text{Eq. 24}$$

It should be noted that $s_{t-\tau}$ represents the possible states the system was τ frames before the current time. Accordingly, the previous x (clean speech), the previous observations, and the previous states for the previous τ time segments are essentially collapsed into a distribution that only includes the previous τ−1 time segments. For example, 256 are collapsed down into 64 (actually numbers will vary depending on application).

B. Predict—Moving Forward Through Time

The second step, prediction, involves branching out each remaining hypotheses M times, once for each possible state $s_t$.

$$q(x_t, n_t, y_1^{t-1}|s_{t-\tau+1}^t) = \int dx_{t-1} \int dn_{t-1} q(x_{t-1}, n_{t-1}, y_1^{t-1}|s_{t-\tau+1}^{t-1}) p(n_t|n_{t-1}) p(x_t|x_{t-1}, s_t) \quad \text{Eq. 25}$$

The switching linear dynamic model determines the prediction for $x_t$. A separate linear dynamic model determines the predictions for $n_t$.

$$p(x_t|x_{t-1}, s_t) = N(x_t; A_{s_t}^x x_{t-1} + b_{s_t}^x, C_{s_t}^x)$$

$$p(n_t|n_{t-1}) = N(n_t; A^n n_{t-1} + b^n, C^n) \quad \text{Eqs. 26 and 27}$$

Because all of the distributions are Gaussian, the integrations are trivial.

C. Observe—Incorporating Current Observation

At this point in the process, an observation becomes available that helps to refine speculation as to where the state is. As a result of the previous steps, $M^\tau$ components that describe $x_t$ will have been obtained, but the current observation $y_t$ will not have been accounted for. Incorporating the current observation enables a production of a posterior distribution for $x_t$ that includes all observations up to and including $y_t$.

In this step, a model of the current observation is used to convert a prior estimate for clean speech and noise, $q(x_1, n_t, y_1^{t-1}|s_{t-\tau}^t)$, into an approximate posterior estimate for clean speech and noise, $q(x_t, n_t y_1^t|s_{t-\tau}^t)$. Because the observation model is non-linear, the approximation described in Section V is utilized.

The following derivation can be applied to any of the $M^\tau$ possible state histories $s_{t-\tau}^t$. To simplify the notation, the following substitutions are made:

$$q(x_t, n_t, y_1^{t-1}|s_{t-\tau}^t) \rightarrow p(x, n)$$

$$q(x_t, n_t, y_1^t|s_{t-\tau}^t) \rightarrow p(x, n, y) \quad \text{Eqs. 28 and 29}$$

At this point, the prior $p(x, n)$ can be written as simple gaussian components.

$$p(x, n) = N(x; \mu_x, \sigma_x) N(n; \mu_n, \sigma_n) \quad \text{Eq. 30}$$

First, the joint distribution over y, r, x, and n is derived. This is the combination of the observation model and the prior model.

$$p(y, r, x, n) = p(y, r|x, n) p(x, n) \quad \text{Eq. 31}$$
$$= \delta(y - \ln(e^r + 1) + r - x) N(x; \mu_x, \sigma_x)$$
$$\delta(y - \ln(e^r + 1) - n) N(n; \mu_n, \sigma_n)$$

It is then desirable to convert this posterior into an approximate posterior of the form:

$$p(x, n, y) = p(x|y) p(n|y) p(y) \quad \text{Eq. 32}$$
$$= N(x; \hat{x}, \hat{\sigma}_x) N(n; \hat{n}, \hat{\sigma}_n) N(y; \hat{y}, \hat{\sigma}_y)$$

This is accomplished with a combination of Taylor series approximation, moment matching, and algebra. To do this, moments of $p(y, r, x, n)$ in x and n must be computed.

$$\int dx x^a \int dn n^b p(y, r, x, n) = \quad \text{Eq. 33}$$
$$(y - \ln(e^r + 1) + r)^a N(y - \ln(e^r + 1) + r; \mu_x, \sigma_x)$$

$$(y - \ln(e^r + 1))^b N(y - \ln(e^r + 1); \mu_n, \sigma_n) \approx \quad \text{Eq. 34}$$
$$(y - (f + F(r - r_0)) + r)^a (y - (f + F(r - r_0))^b$$

$$N(y; \hat{y}, \hat{\sigma}_y) N(r; \hat{r}, \hat{\sigma}_r) \quad \text{Eq. 35}$$

where $f + F(r - r_0)$ is the Taylor series expansion of $\ln(e^r + 1)$, and $$f = \ln(e^{r_0} + 1) \quad \text{Eqs. 36-41}$$
$$F = \frac{1}{e^{r_0} + 1}$$
$$\hat{\sigma}_y = F^2 \sigma_x + (I - F)^2 \sigma_n$$
$$\hat{y} = f + \mu_n + F(\mu_x - \mu_n - r_0)$$
$$\hat{\sigma}_r = \left((I - F)^2 (\sigma_x)^{-1} + F^2 (\sigma_n)^{-1}\right)^{-1}$$
$$\hat{r} = (\hat{\sigma}_r)((F - I)(\sigma_x)^{-1}(y - f + F r_0 - \mu_x) + F(\sigma_n)^{-1}(y - f + F r_0 - \mu_n))$$

Now, Equation 35 can be used to compute the parameters of the latter half of Equation 32.

$$p(y|s) = N(y; \hat{y}, \hat{\sigma}_y)$$

$$\hat{x} = E[x|y, s] = y - (f + F(\hat{r} - r_0)) + \hat{r}$$

$$\hat{n} = E[x|y, s] = y - (f + F(\hat{r} - r_0))$$

$$\hat{\tau}_x = E[(x - \hat{x})^2 | y, s] = (F - I)^2 \hat{\tau}_r$$

$$\hat{\tau}_n = E[(n - \hat{n})^2 | y, s] = F^2 \hat{\tau}_r \quad \text{Eqs. 42-46}$$

The approximate posterior computation is then complete. The GPB algorithm moves forward one step in time, and then the steps are repeated.

D. Enhancement

In accordance with one aspect of the present invention, it is desirable to generate a representation that is only the function of all the observations and the current clean speech. Given the processing up to this point, what has been generated is a representation that is a function of the current clean speech, all the observations, as well as all of the states (i.e., the current s, the previous s and all previous s up to τ frames in the past). The goal, therefore, becomes to eliminate states and just keep relevant variables. This process of eliminating unwanted variables is referred to as marginalization. Equations for performing marginalization are provided below.

In addition to serving as the input for the next frame to process, the approximate Gaussian posterior can also be used to produce estimates of the moments of $x_t$. In accordance with one embodiment, these moments are utilized to perform noise robust recognition. The minimum mean-square error (MMSE) estimate $E[x_t|y_1^t]$ can be fed directly to a traditional recognition system, or augmented with the second moment for use with uncertainty decoding. In accordance with one embodiment, calculation can be accomplished as follows:

$$q(x_t, y_1^t) = \sum_{s_{t-\tau+1}^t} q(x_t, y_1^t | s_{t-\tau+1}^t) p(s_{t-\tau+1}^t) \qquad \text{Eqs. 47-49}$$

$$E[x_t | y_1^t] \approx \frac{\int x_t q(x_t, y_1^t) dx_t}{\int q(x_t, y_1^t) dx_t}$$

$$E[(x_t)^2 | y_1^t] \approx \frac{\int (x_t)^2 q(x_t, y_1^t) dx_t}{\int q(x_t, y_1^t) dx_t}$$

VII. Exemplary Implementations

Figure 8:
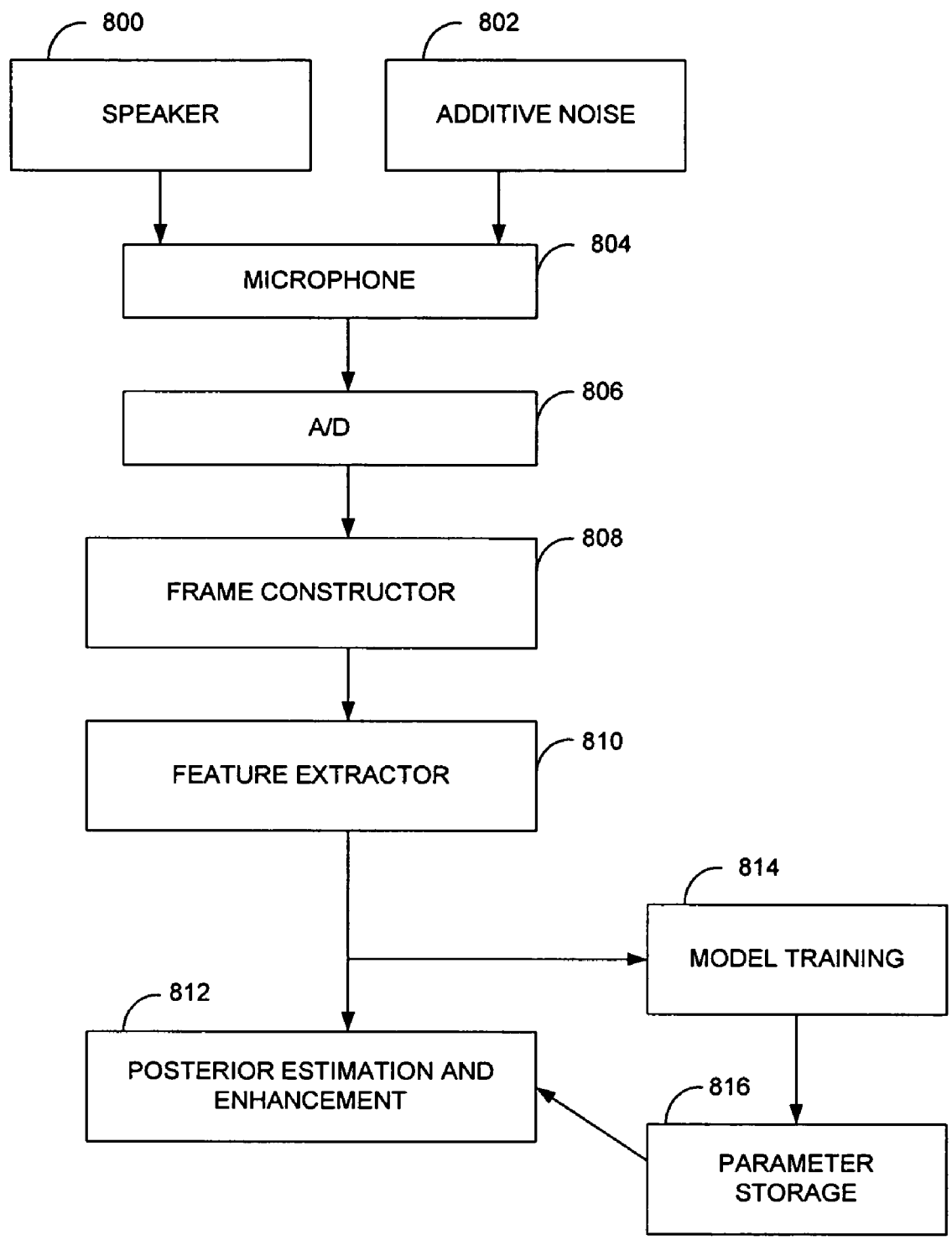
FIG. 8 is a block diagram of an enhancement system within which embodiments of the present invention may be implemented.

FIG. 8 is a block diagram of a noise reduction system in which embodiments of the present invention may be implemented. In accordance with block 814, data is utilized to train parameters associated with noise and clean speech models as necessary. In accordance with one embodiment, the training is based on clean training speech and a training text. After they have been trained, the model parameters are stored in a storage unit 816.

Analysis typically begins with receipt of an input utterance. A microphone 804 converts audio waves from a speaker 800 and one or more additive noise sources 802 into electrical signals. The electrical signals are then sampled by an analog-to-digital converter 806 to generate a sequence of digital values, which are grouped into frames of values by a frame constructor 808. In one embodiment, A-to-D converter 806 samples the analog signal at 16 kHz and 16 bits per sample, thereby creating 32 kilobytes of speech data per second, and frame constructor 808 creates a new frame every 10 milliseconds that includes 25 milliseconds worth of data. Each from of data provided by frame constructor 808 is converted into a feature vector by a feature extractor 810. Methods for identifying such feature vectors are well known in the art and include 39-dimensional Mel-Frequency Cepstrum Coefficients (MFCC) extraction. Finally, as is indicated by block 812, posterior estimation and enhancement are carried out based on the supplied feature vectors and model parameters. For example, a related MMSE estimate is fed to a speech recognition system for recognition purposes, or augmented for use with uncertainty decoding.

Figure 9:
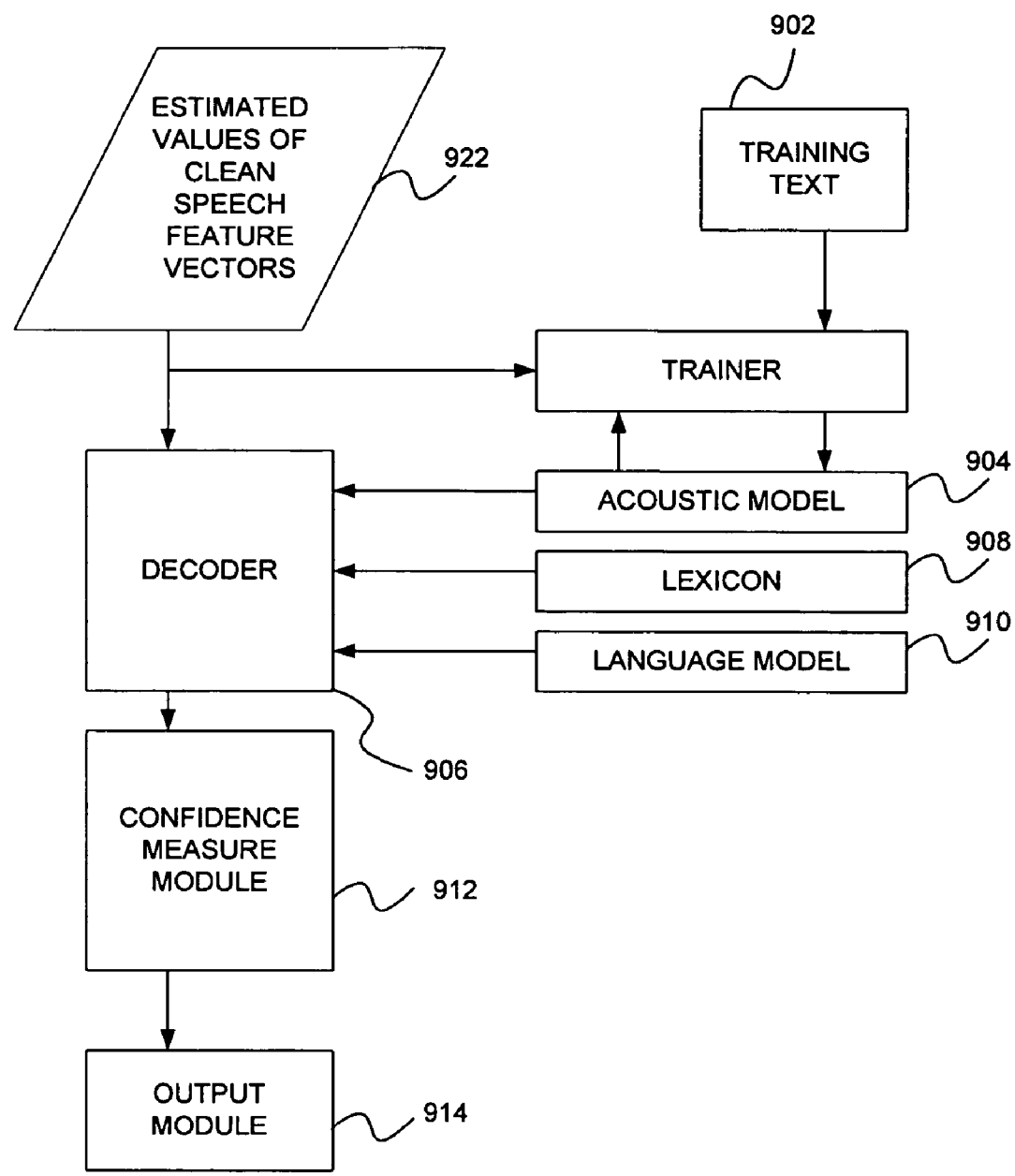
FIG. 9 is a block diagram of a pattern recognition system within which embodiments of the present invention may be implemented.

Resulting estimated values for signal-to-noise ratios, clean speech feature vectors, and other related data representations can actually be utilized for any desired purpose. In one embodiment, estimated values for clean speech feature vectors are used directly in a speech recognition system as is shown in FIG. 9.

If the input signal is a training signal, the series of estimated values for the clean speech feature vectors can be provided to a trainer 900, which uses the estimated values for the clean speech feature vectors and a training text 902 to train an acoustic model 904. Specific techniques for training such models are known in the art and a description of them is not required for an understanding of the present invention.

If the input signal is a test signal, the estimated values of the clean speech feature vectors are provided to a decoder 906, which identifies a most likely sequence of words based on the stream of feature vectors, a lexicon 908, a language model 910 and the acoustic model 904. The particular method used for decoding is not important to the present invention and any of several known methods for decoding may be implemented.

The most probable sequence of hypothesis words is provided to a confidence measure module 912. Confidence measure module 912 identifies which words are most likely to have been improperly identified by the speech recognizer, based in part on a secondary acoustic model (not shown). Confidence measure module 912 then provides the sequence of hypotheses words to an output module 914 along with identifiers indicating which words may have been improperly identified. Those skilled in the art will recognize that at least confidence measure module 912 is not necessary for the practice of the present invention.

Although FIGS. 8 and 9 depict speech systems, the present invention may be implemented in any pattern recognition system and is not limited to speech.

Although the present invention has been described with reference to particular embodiments, workers skilled in the art will recognize that changes may be made in form and detail without departing from the spirit and scope of the invention.

What is claimed is:

1. A computer-readable storage medium having instructions embedded thereon that, when executed by a computing device, cause the computing device to perform a method for enhancing the noise robustness of a speech recognition system, the method comprising:
    applying a switching linear dynamic model to generate a representation of acoustic features;
    utilizing the representation as a component for conducting model based feature enhancement;
    wherein utilizing the representation of acoustic features comprises utilizing the representation as a basis for computing a posterior estimation;
    wherein utilizing the representation as a basis for computing a posterior estimation comprises applying a generalized pseudo-Bayesian algorithm to reduce the size of a search space;
    wherein applying the generalized pseudo-Bayesian algorithm comprises collapsing a plurality of state histories; and
    wherein applying the generalized pseudo-Bayesian algorithm further comprises branching out a plurality of remaining state histories.

2. The method of claim 1, wherein said applying to generate a representation comprises applying to determine a probability of a clean speech feature vector.

3. The method of claim 2, wherein said utilizing comprises utilizing the probability.

4. The method of claim 1, wherein applying a switching linear dynamic model to generate a representation of acoustic features comprises applying a switching linear dynamic model to generate a representation of speech.

5. The method of claim 1, wherein applying a switching linear dynamic model to generate a representation of acoustic features comprises applying a switching linear dynamic model to generate a representation of clean speech.

6. The method of claim 1, further comprising:
    applying a linear dynamic model to generate a representation of noise; and
    utilizing the representation of noise as a second component for conducting model based feature enhancement.

7. The method of claim 6, wherein said applying a linear dynamic model to generate a representation of noise comprises applying to determine a probability of a noise feature vector.

8. The method of claim 1, further comprising:
    applying a switching linear dynamic model to generate a representation of noise; and
    utilizing the representation of noise as a second component for conducting model based feature enhancement.

9. The method of claim 8, wherein said applying a switching linear dynamic model to generate a representation of noise comprises applying to determine a probability of a noise feature vector.

10. The method of claim 1, further comprising
applying an observation model to generate a representation of how speech and noise produce a noisy observation; and
utilizing the representation of how speech and noise produce a noisy observation as a second component for conducting model based feature enhancement.

11. The method of claim 1, wherein applying the generalized pseudo-Bayesian algorithm further comprises utilizing a model of a current observation to convert a prior estimate for clean speech and noise into an approximate posterior estimate for clean speech and noise.

12. The method of claim 11, wherein utilizing a model of a current observation comprises utilizing a representation of how speech and noise produce a noisy observation.

13. The method of claim 1, further comprising utilizing the posterior estimation as a basis for model based feature enhancement.

14. The method of claim 13, further comprising:
determining clean speech estimations within a plurality of time frames based at least in part on the posterior estimation; and
conducting noise robust speech recognition based at least in part on said clean speech estimations.

15. A computer-readable storage medium having instructions embedded thereon that, when executed by a computing device, cause the computing device to perform a method for enhancing the noise robustness of a speech recognition system, the method comprising:
applying a linear dynamic model to generate a representation of speech;
utilizing the representation as a basis for model based feature enhancement;
wherein utilizing the representation comprises utilizing the representation as a basis for computing a posterior estimation;
wherein utilizing the representation as a basis for computing a posterior estimation comprises applying a generalized pseudo-Bayesian algorithm to reduce the size of a search space; and
wherein applying the generalized pseudo-Bayesian algorithm comprises collapsing a plurality of state histories branching out a plurality of remaining state histories.

16. The method of claim 15, wherein said applying to generate a representation comprises applying to determine a probability of a clean speech feature vector.

17. The method of claim 16, wherein said utilizing comprises utilizing the probability.

18. The method of claim 15, further comprising
applying an observation model to generate a representation of how speech and noise produce a noisy observation; and
utilizing for model based feature enhancement the representation of how speech and noise produce a noisy observation.

19. The method of claim 15, further comprising utilizing the posterior estimation as a basis for model based feature enhancement.

20. A speech recognition system, comprising:
a switching linear dynamic model configured to be applied to determine a probability of a clean speech feature vector;
a linear dynamic model configured to be applied to determine a representation of a noise feature;
an observation model configured to be applied to generate a representation of how speech and noise together produce a noisy observation; and
processing means for utilizing the switching linear dynamic model, the linear dynamic model and the observation model as bases for determining a posterior estimation, the processing means being further configured to apply the posterior estimation as a basis for conducting model based feature enhancement, wherein the processing means determines the posterior estimation by applying a generalized pseudo-Bayesian algorithm to reduce the size of a search space, and wherein applying a generalized pseudo-Bayesian algorithm comprised collapsing a plurality of state histories and branching out a plurality of remaining state histories.

* * * * *